(12) United States Patent
Hoelzl

(10) Patent No.: US 10,436,249 B2
(45) Date of Patent: Oct. 8, 2019

(54) METHOD FOR PRODUCING A PLAIN BEARING BUSH

(71) Applicant: Miba Gleitlager Austria GmbH, Laakirchen (AT)

(72) Inventor: Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 15/912,835

(22) Filed: Mar. 6, 2018

(65) Prior Publication Data

US 2018/0313404 A1 Nov. 1, 2018

(30) Foreign Application Priority Data

Apr. 26, 2017 (AT) ............... A 50341/2017

(51) Int. Cl.
| F16C 33/10 | (2006.01) |
| F16C 17/02 | (2006.01) |
| F16C 33/04 | (2006.01) |
| F16H 57/04 | (2010.01) |
| F16C 33/12 | (2006.01) |

(Continued)

(52) U.S. Cl.
CPC .......... *F16C 33/1055* (2013.01); *F16C 17/02* (2013.01); *F16C 33/122* (2013.01); *F16C 33/14* (2013.01); *F16H 57/0479* (2013.01); *F03D 80/70* (2016.05); *F16C 33/046* (2013.01); *F16C 33/1025* (2013.01); *F16C 2226/14* (2013.01); *F16C 2226/36* (2013.01); *F16C 2360/31* (2013.01); *F16C 2361/61* (2013.01)

(58) Field of Classification Search
CPC .... F16C 17/02; F16C 32/0685; F16C 33/122; F16C 33/203; F16C 33/046; F16C 33/1025; F16C 33/1055; F16C 2226/12; F16C 2226/14; F16C 2226/36; F16C 2360/31; F16C 2361/61; C08J 5/16; B23B 15/04; B23P 15/003; F03D 80/70; F16H 57/0479; F16H 2057/085; B23Q 15/04
USPC ....... 384/129, 261, 275–276, 280, 286, 290, 384/283; 29/898.042, 898.056, 898.059, 29/898.06
See application file for complete search history.

(56) References Cited

U.S. PATENT DOCUMENTS 2,198,074 A * 4/1940 Berry ............... B23P 15/003
29/898.059
2,377,681 A 6/1945 Etchells
(Continued)

FOREIGN PATENT DOCUMENTS

| AT | 513 743 A4 | 7/2014 |
| AT | 516 029 B1 | 2/2016 |

(Continued)

*Primary Examiner* — Marcus Charles
(74) *Attorney, Agent, or Firm* — Collard & Roe, P.C.

(57) ABSTRACT

A method for producing a plain bearing bush includes providing a flat supporting metal layer and an anti-friction layer on this supporting metal layer to produce a flat composite material. The flat composite material is then rolled into the shape of the plain bearing bush in such a way that the supporting metal layer in the plain bearing bush is disposed radially underneath the anti-friction layer. The plain bearing bush includes the supporting metal layer disposed underneath the anti-friction layer in the radial direction.

7 Claims, 2 Drawing Sheets

(51) Int. Cl.
*F16C 33/14* (2006.01)
*F03D 80/70* (2016.01)

(56) References Cited

U.S. PATENT DOCUMENTS

| | | | |
|---|---|---|---|
| 2,449,662 A | | 9/1948 | Leeson |
| 2,821,010 A | | 1/1958 | Vasconi et al. |
| 3,153,990 A | | 10/1964 | Kunzog |
| 3,409,966 A | | 11/1968 | Hilbish |
| 4,865,467 A | * | 9/1989 | Becker .................. F16C 33/046 384/273 |
| 4,988,217 A | * | 1/1991 | Iijima ..................... F16C 33/06 384/273 |
| 5,274,921 A | | 1/1994 | Kawagoe et al. |
| 6,769,597 B1 | | 8/2004 | Seizu |
| 7,829,201 B2 | * | 11/2010 | Zidar ..................... C22C 11/06 384/129 |
| 8,591,371 B2 | * | 11/2013 | Dinter .................... F03D 80/70 475/160 |
| 8,790,213 B1 | | 7/2014 | Isayama et al. |
| 9,022,656 B2 | | 5/2015 | Burgeff et al. |
| 9,419,495 B2 | | 8/2016 | Kari |
| 9,784,245 B2 | | 10/2017 | Hager et al. |
| 2004/0105717 A1 | * | 6/2004 | Weiss ..................... F16D 1/095 403/1 |
| 2005/0260431 A1 | * | 11/2005 | Wolki .................... F16C 33/28 428/626 |
| 2006/0251887 A1 | * | 11/2006 | Welsch ................. F16C 27/063 428/339 |
| 2012/0051915 A1 | | 3/2012 | Suzuki et al. |
| 2013/0279835 A1 | | 10/2013 | Akita et al. |
| 2017/0219088 A1 | | 8/2017 | Hoelzl |

FOREIGN PATENT DOCUMENTS

| | | | | |
|---|---|---|---|---|
| CN | 87103045 A | | 5/1988 | |
| CN | 2040177 U | | 6/1989 | |
| CN | 2886186 Y | | 4/2007 | |
| CN | 2888164 Y | | 4/2007 | |
| CN | 200982350 Y | | 11/2007 | |
| CN | 102966669 A | | 3/2013 | |
| CN | 103185132 A | | 7/2013 | |
| CN | 203395019 U | | 1/2014 | |
| DE | 102005045701 A1 | * | 3/2007 | ............ B32B 15/01 |
| DE | 102005047625 A1 | | 4/2007 | |
| DE | 10 2008 049 747 A1 | | 4/2010 | |
| DE | 102008056965 A1 | * | 5/2010 | .............. C25D 5/10 |
| DE | 112011104685 T5 | | 10/2013 | |
| DE | 10 2016 219 800 A1 | | 4/2017 | |
| EP | 0306065 A2 | | 3/1989 | |
| EP | 1184098 A2 | | 3/2002 | |
| EP | 2 383 480 A1 | | 11/2011 | |
| RU | 2190635 C2 | * | 10/2002 | ................ C08J 5/16 |
| RU | 2404377 C1 | * | 11/2010 | ............. F16C 33/20 |
| WO | WO-2007033709 A1 | * | 3/2007 | ........... B32B 15/015 |
| WO | 2013/106878 A1 | | 7/2013 | |
| WO | 2016058018 A1 | | 4/2016 | |

* cited by examiner

METHOD FOR PRODUCING A PLAIN BEARING BUSH

CROSS REFERENCE TO RELATED APPLICATIONS

Applicant claims priority under 35 U.S.C. § 119 of Austrian Application No. A 50341/2017 filed on Apr. 26, 2017, the disclosure of which is incorporated by reference.

BACKGROUND OF THE INVENTION

1. Field of the Invention

The invention relates to a method for producing a plain bearing bush whereby a flat supporting metal layer is provided, an anti-friction layer is provided on this supporting metal layer to produce a flat composite material, and the flat composite material is then rolled into the shape of the plain bearing bush.

The invention further relates to a rolled plain bearing bush made from a composite material comprising a supporting metal layer and an anti-friction layer.

The invention also relates to a shaft, in particular a planet gear shaft for a wind turbine gear mechanism, having a plain bearing bush.

The invention further relates to a wind turbine gear mechanism having at least one gear which is mounted on a shaft, and a bearing point having a plain bearing bush is disposed between the gear and the shaft.

2. The Prior Art

Plain bearing bushes are generally of a design whereby the bearing material is applied to the bush internal face. Based on this approach, the bush is never shrunk onto the shaft but is pressed into the bearing seat.

In the wind energy sector, however, EP 2 383 480 A1 also discloses a plain bearing bush non-rotatingly connected to a shaft. This publication describes a planetary gear mechanism for a wind turbine having at least one sun gear, a hollow gear and a planetary carrier in which a plurality of planetary gears are mounted. For mounting the planetary gears, a plurality of radial plain bearings are provided, which each comprise a sleeve made from a plain bearing material which is secured as an inner ring on the planetary gear shaft, and a co-operating bearing outer ring is formed by the bore of the planetary gear. Copper-zinc alloys, copper-tin alloys and aluminum-tin alloys are described as plain bearing materials. It is also stated that a cost-effective method of producing a plain bearing is roll-bonding the plain bearing material respectively onto a steel supporting body. However, this publication provides no information about the radial sequence in which the individual layers are disposed. In particular, the skilled person will not find a multi-layered structure of the plain bearing bushes in the drawings but only a single-layer material. It is therefore clear to the skilled person with a general technical background in the described field that in the multi-layered embodiment of the plain bearing bush, the plain bearing material forms the radially inner layer.

AT 513 743 A4 discloses a wind turbine gear mechanism having at least one gear which is mounted on a shaft, and a bearing point with a plain bearing is disposed between the gear and the shaft. In particular, the slide bearing is configured as a plain bearing bush and can be non-rotatingly connected to the shaft or to the gear. Furthermore, the plain bearing bush is a multi-layered plain bearing.

SUMMARY OF THE INVENTION

The underlying objective of this invention is to reduce and/or prevent creep in a plain bearing bush non-rotatingly disposed on a shaft, in particular when used in a wind turbine gear mechanism.

The objective of the invention is achieved by means of the plain bearing bush outlined above in which the supporting metal layer is disposed underneath the anti-friction layer in the radial direction.

The objective of the invention is also achieved by means of the shaft outlined above, wherein the plain bearing bush is based on the design proposed by the invention.

The objective of the invention is also achieved by means of the wind turbine gear mechanism outlined above, wherein the shaft is based on the design proposed by the invention.

Furthermore, the objective of the invention is achieved by means of the method outlined above, whereby the composite material is rolled in such a way that the supporting metal layer in the plain bearing bush is disposed radially underneath the anti-friction layer.

The advantage of this is that by inversely rolling the flat composite material to produce the plain bearing bush on the shaft, the material combination of steel-hard backing metal layer, in particular steel, is obtained relatively inexpensively. Creep and/or relaxation phenomena in the region of the non-rotating connection of the plain bearing bush to the shaft can be more easily prevented or reduced. Another advantage is obtained in that the flat composite material is rolled by means of the hardest material of the composite material, thereby enabling post-processing work on the plain bearing bush to be reduced. Repair work on the plain bearing bush in the wind turbine gear mechanism can also be carried out more easily because the shaft of the gear is more readily accessible (compared with dismantling the gears of the gear mechanism). This enables any creep which might occur in the softer layer(s) of the plain bearing bush to be more easily rectified or remedied.

The plain bearing bush may have a weld seam in an axial direction. The material bonding of the two open ends of the rolled composite material enables the resistance of the plain bearing bush to deformation to be improved. Compared with interlocked designs, the material bonding enables a more homogeneous anti-friction surface of the plain bearing bush to be provided.

Based on one embodiment in this respect, the plain bearing bush may have an oil groove extending in the axial direction next to the weld seam. Although it might seem obvious as such to provide the oil groove at least partially in the weld seam because changes in the material on the surface of the anti-friction layer due to welding can be removed and finishing work carried out on the weld seam in one operation, the advantage gained by providing the oil groove next to the weld seam is that the entire anti-friction layer and optionally a part of the supporting metal layer can be removed to create a groove in which welding takes place in order to produce the weld seam. The oil groove itself may be provided in the form of a "closed groove", i.e. it does not extend across the entire width in the axial direction of the plain bearing bush, in other words not right into the lateral end faces. This better prevents oil loss due to lateral leakage.

For the reasons outlined above, the plain bearing bush is non-rotatingly connected to the shaft, in particular is shrunk onto it.

Furthermore, a lubricant supply line may be provided in the shaft and a bore is provided in the supporting metal layer of the plain bearing bush which opens into an oil groove in the anti-friction layer extending in the axial direction. Supplying lubricant via the shaft simplifies the lubricant supply system for the bearing points, thereby enabling the wind turbine gears to be made to a more compact design.

BRIEF DESCRIPTION OF THE DRAWINGS

To provide a clearer understanding, the invention will be explained in more detail below with reference to the appended drawings.

These are highly simplified, schematic diagrams respectively illustrating the following.

DETAILED DESCRIPTION OF THE PREFERRED EMBODIMENTS

Figure 1:
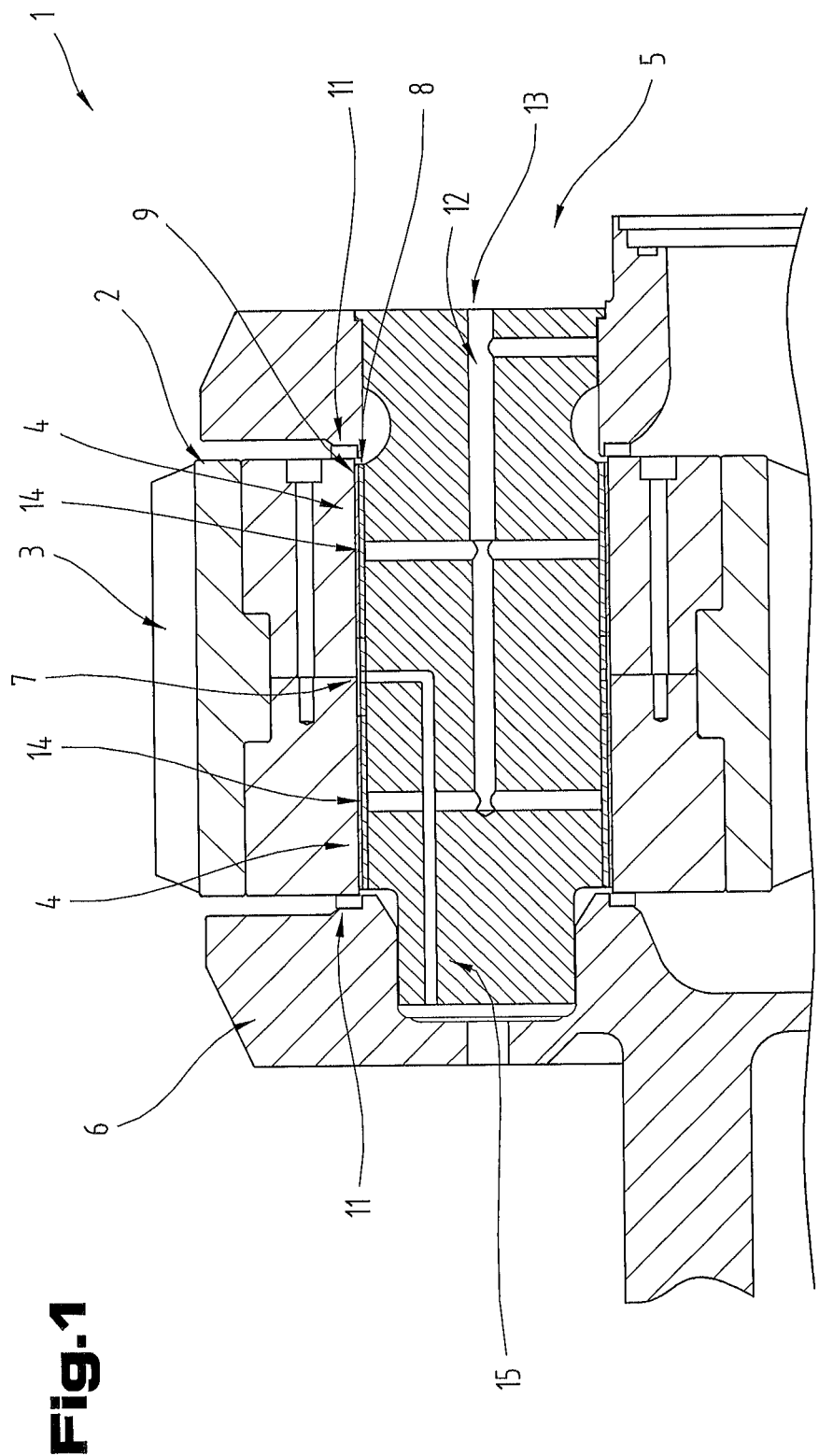
FIG. 1 a cross-section through a part of a wind turbine gear mechanism.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 illustrates a cross-section through a part of a wind turbine gear mechanism 1. The wind turbine gear mechanism 1 is provided in the form of a (single) planetary gear in particular.

In a known manner, wind turbines comprise a tower and a gondola disposed at its top end, in which the rotor with the rotor blades is mounted. This rotor is operatively connected via a gear to a generator, which is also located in the gondola, the low speed of the rotor being translated into a higher speed of the generator rotor via the gear. Since such designs of wind turbines constitute prior art, reference may be made to the relevant literature.

The wind turbine gear mechanism 1 has at least one gear 2. In the wind turbine gear mechanism 1, this gear 2 is disposed in a meshing engagement between a second and a third gear (neither of which is illustrated). To this end, the at least one gear 2 has external toothing 3.

In the embodiment of the wind turbine gear mechanism 1 based on a planetary gear, in particular constituting the main gear mechanism of a wind turbine, the second gear is configured as a sun gear with spur toothing which is non-rotatingly connected to a shaft leading to the generator rotor. The sun gear is usually surrounded by a plurality of gears 2, the planetary gears, for example two, preferably three or four.

The third gear is configured as a ring gear which surrounds the at least one gear 2 and/or the gears 2 in the radial direction and which likewise has toothing on at least part of an inner surface which is in a meshing engagement with the external toothing 3 of the gear 2 or gears 2. The ring gear is non-rotatingly connected to a rotor shaft of the rotor of the wind turbine or non-rotatingly connected to the housing of the wind turbine gear mechanism 1.

The toothing of the gears in the wind turbine gear mechanism 1 may be configured as straight teeth or helical teeth.

Figure 2:
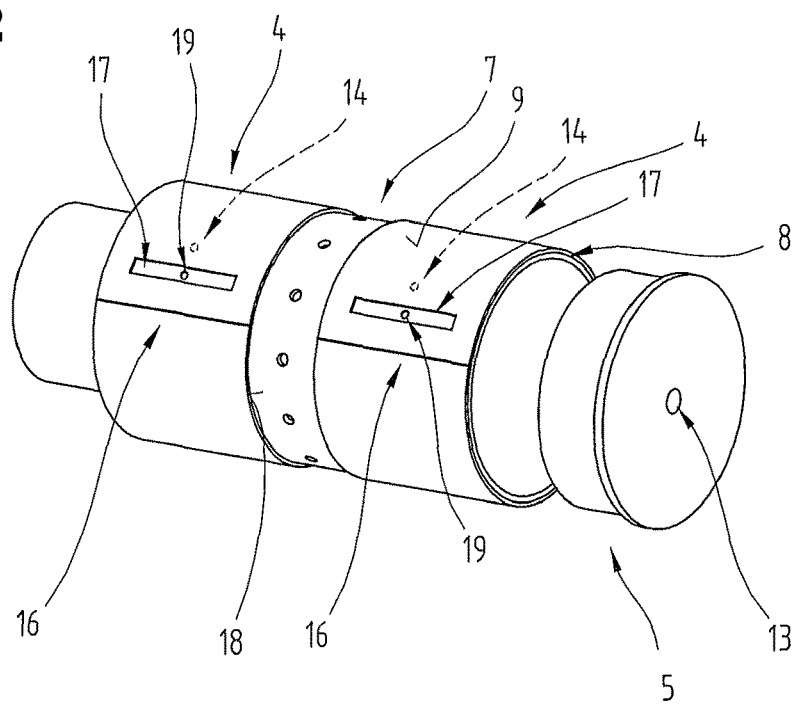
FIG. 2 a shaft viewed from an angle.

The at least one gear 2 (only one gear 2 will be described hereafter, and these explanations can also be applied to all or a plurality of gears 2) is mounted via a plurality of plain bearing bushes 4 on a shaft 5, for example a planet shaft (the so-called planetary shaft). This shaft 5, which can be seen more readily in FIG. 2, may be retained in bores of a gear carrier 6.

It should be pointed out that not only single-stage configurations of such wind turbine gear mechanisms 1 are possible within the scope of the invention but also multi-stage, for example two- or three-stage configurations, in which case other spur gear stages can be integrated in at least one gear 2, in particular a planet. Also conceivable within the scope of the invention are parallel gears, which to this extent fall within the scope of the substantive description. Accordingly, the wind turbine gear mechanism 1 may have a single planetary gear and a parallel two-stage or multi-stage planetary gear or generally a plurality of planetary gears.

It should also be pointed out that the invention may be used not just in planetary gears of wind turbines, although this is preferred, but also generally in gears for wind turbines, in particular for translating the slow speed of the rotor of a wind turbine into a higher speed. Other applications of the plain bearing bush 4 are also possible within the scope of the invention.

The plain bearing bushes 4 are spaced apart from one another in the axial direction, thus creating a gap 7.

The plain bearing bushes 4 are non-rotatingly connected to the shaft 5. To obtain a non-rotating connection, the plain bearing bushes 4 are shrunk onto the shaft 5 in particular (press fit). However, it would also be possible to use other methods for producing the non-rotating connection. For example, the plain bearing bushes 4 can be welded to the shaft 4 or connected by means of pins. The plain bearing bushes 4 may also be positively and/or non-positively and/or non-positively connected to the shaft 4.

Figure 3:
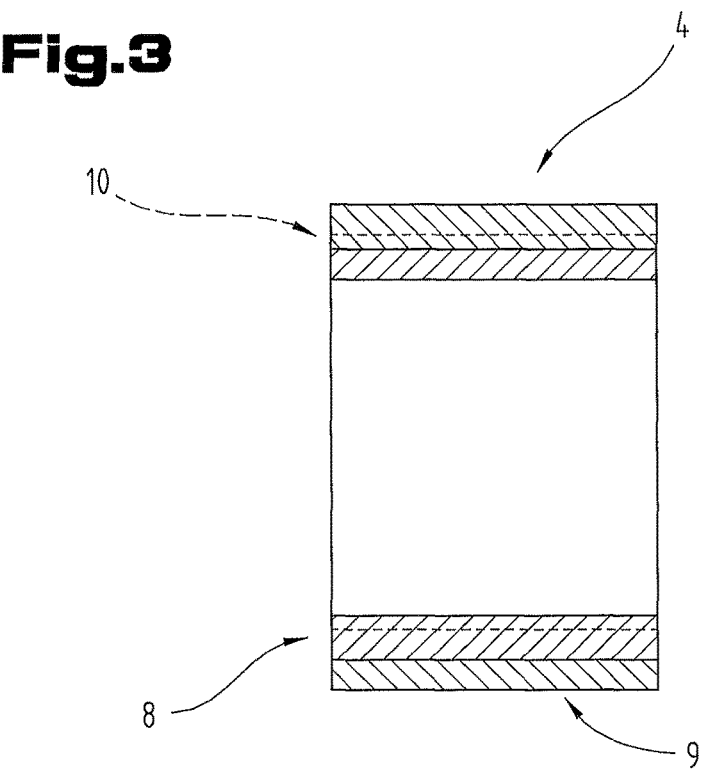
FIG. 3 a section through a plain bearing bush.

The plain bearing bushes 4 are configured as multilayered plain bearings, as may be seen from FIG. 3 in particular.

The plain bearing bushes 4 comprise a supporting metal layer 8 and an anti-friction layer 9 applied to the supporting layer 8. The anti-friction layer 9 therefore forms a running surface for the gear 2 and/or the component to be mounted. By contrast with conventional plain bearing bushes, the supporting metal layer 8 is disposed underneath the anti-friction layer 9 in the radial direction so that it sits in direct contact with the surface of the shaft 4 against which it lies and/or to which it is non-rotatingly connected. The anti-friction layer 9 is therefore the radially outermost layer.

In addition to this two-layered configuration of the plain bearing bushes 4, another option would be to provide intermediate layers between the anti-friction layer 9 and supporting metal layer 8, for example a bearing metal layer 10, as indicated by broken lines in FIG. 3. Furthermore, at least one bonding layer and/or at least one diffusion barrier layer may be provided between the supporting metal layer 8 and anti-friction layer 9 and/or between the bearing metal layer 10 and anti-friction layer 9 and/or between the supporting metal layer 8 and bearing metal layer 10. Based on another option, an anti-wear layer or a running-in layer is provided on the anti-friction layer 9 and thus forms the radially outermost layer in this instance.

The respective layers may be joined directly to one another so that, for example, the supporting metal layer 8 is joined directly to the anti-friction layer 9 or to the bearing metal layer 10 or to a bonding layer or to a diffusion barrier layer. The same applies if there is a different layer sequence in the context of the layers of the plain bearing bushes 4 specified above.

The supporting metal layer 2 comprises in particular a steel backing. However, it may also be made from another material that will impart the requisite dimensional stability to the plain bearing bushes 4.

The optionally provided bearing metal layer 10 may be a (lead-free) copper or aluminum alloy or tin alloy, for example. Examples of these are AlSn6CuNi, AlSn20Cu, AlSi4Cd, AlCd3CuNi, AlSi11Cu, AlSn6Cu, AlSn40, AlSn25CuMn, AlSi11CuMgNi, CuSn10, CuAl10Fe5Ni5, CuZn31Si1, CuPb24Sn2, CuSn8Bi10, SnSb8Cu4, SnSb12Cu6Pb.

The anti-friction layer 9 may be, for example, a copper-lead alloy, for example CuPb22Sn2.5, or a copper-tin alloy, for example CuSn5Zn, or an aluminum-based alloy, for example AlSn20Cu, AlSn25Cu1.5Mn0.6, or may be an anti-friction lacquer, for example having a polyamide imide base with $MoS_2$ and/or graphite.

The wear-resistant layer 5 may be, for example, tin, lead, bismuth or a bismuth alloy, or an anti-friction lacquer, for example having a polyamide imide base with MoS2 and/or graphite.

The diffusion barrier layer and/or the bonding layer may be, for example, Al, Mn, Ni, Fe, Cr, Co, Cu, Ag, Mo, Pd and NiSn or CuSn alloys.

For the sake of completeness, it should be noted that the individual layers may be of differing compositions, at least in terms of quantity, in particular also quality, In the axial extension, in addition to a plain bearing bush 4, a thrust washer 11 may be provided respectively between the plain bearing bushes 4 and/or the gear 2 and gear carrier 6.

FIG. 1 also illustrates a preferred embodiment of the lubricant supply to the running surfaces of the plain bearing bushes 4. To this end, lubricant, in particular lubricating oil, can be fed via bore 12 and a channel-shaped recess in the shaft 5, from a lubricant inlet 13 which is connected to a lubricant reservoir, not illustrated, into regions 14 of the running surfaces of the plain bearing bushes 4, from which the lubricant is distributed across at least approximately the entire running surface. The bore 13 and/or the recess preferably have several sections, which in particular have either a radially outward pointing or an axial extension.

As may be seen from FIG. 1, the bore 12 or the recess has at least one branch to enable the lubricant to be supplied to all the bearing points and each of the two plain bearing bushes 4 therefore has at least one separate lubricant supply. Optionally, a plurality of lubricant outlets to the bearing point may be distributed around the circumference of the plain bearing bushes 4, for example two or three or four, etc.

The lubricant may be supplied exclusively via the shaft 5.

To provide a better distribution of lubricant across at least more or less all the running surfaces, the gap 7 is preferably connected to the ambient atmosphere via at least one connecting line 15. The connecting line 15 preferably extends through the shaft 5, as may be seen from FIG. 1.

In order to feed the lubricant away from the bearing regions, separate discharge lines (not illustrated) may be provided. However, at least some of the lubricant can also be fed away via the connecting line 15 in the shaft 5.

It should be noted that instead of two plain bearing bushes 4, it would also be possible to use only one or more than two plain bearing bush(es) 4, in particular in different applications of the plain bearing bush 4 for wind turbines.

In order to produce the plain bearing bush 4, a flat (i.e. level) supporting metal layer 8 or a corresponding flat supporting metal layer blank is prepared. To produce a flat composite material, the anti-friction layer 9 is provided on this flat supporting metal layer 8 and joined to the supporting metal layer 8 if no intermediate layers are provided. If intermediate layers are used, they are provided one after the other on the flat supporting metal layer 8 in the correct sequence.

The layer(s), in particular the anti-friction layer 9, may be joined to the bearing metal layer 8 by rolling in particular, for which purpose corresponding strips of the material are used for the other layer(s). However, other deposition methods would also be possible, for example galvanic deposition or deposition using a PVD or CVD process.

After producing this flat composite material, it is rolled in a roller mill to obtain the shape of the plain bearing bush 4 such that the supporting metal layer 8 in the plain bearing bush is disposed radially underneath the anti-friction layer 9 and the anti-friction layer 9 forms the radially outermost layer for forming the running surface.

Based on another embodiment, the plain bearing bush 4 has a weld seam 16. After rolling, the plain bearing bush 4 is still open in the region of the axial end faces. In order to join these two end faces to one another, they are preferably welded to one another, with or without additives. Prior to welding, the anti-friction layer 9 is preferably removed across the entire thickness in the radial direction and optionally a part of the supporting metal layer 8 in order to create a groove. The mutual welding is then effected in this groove and, this being the case, only the supporting metal layer 8 is welded.

However, other joining methods would also be possible and the two axial end faces may be mutually interlocked, for example.

Based on another embodiment, at least one oil groove 17 extending in the axial direction is provided next to the weld seam 16. The oil groove 17 is preferably disposed at a distance from the weld seam 16 that is between 0.5% and 10% of the external circumference of the running surface of the anti-friction layer 9 (as viewed in the axial direction).

It is also preferable if the oil groove 17 terminates short of and at a distance from axial end faces 18 of the plain bearing bush 4, in other words does not extend continuously across the entire running surface in the axial direction. The distance of the oil groove from the axial end faces 18 may be selected from a range of 2% to 20% of the axial total length of the plain bearing bush 4.

If the at least one oil groove 17 is provided, the lubricant supply line, namely the radial sections thereof in particular, open into this oil groove 17, for which purpose a corresponding bore 19 is provided in the supporting metal layer 8 and optionally in the anti-friction layer 9 through which the lubricant is fed.

The embodiments illustrated as examples represent possible variants and it should be pointed out at this stage that the individual variants may be used in various combinations.

For the sake of good order, finally, it should be pointed out that, in order to provide a clearer understanding of the structure of the plain bearing bush 4 and wind turbine gear mechanism 1, the latter are not necessarily illustrated to scale.

LIST OF REFERENCE NUMBERS

1 Wind turbine gear mechanism
2 Gear

3 External toothing
4 Plain bearing bush
5 Shaft
6 Gear carrier
7 Gap
8 Supporting metal layer
9 Anti-friction layer
10 Bearing metal layer
11 Thrust washer
12 Bore
13 Lubricant inlet
14 Region
15 Connecting line
16 Weld seam
17 Oil groove
18 End face
19 Bore

The invention claimed is:

1. A method for producing a plain bearing bush whereby a flat supporting metal layer is provided, an anti-friction layer is provided on this supporting metal layer to produce a flat composite material, and the flat composite material is then rolled into the shape of the plain bearing bush, wherein the flat composite material is rolled in such a way that the supporting metal layer in the plain bearing bush is disposed radially underneath the anti-friction layer, wherein after the rolling the plain bearing bush has open ends running in an axial direction, wherein the open ends are welded to one another such that a weld seam in the axial direction is formed, wherein an oil groove extending in the axial direction is in the plain bearing bush, the oil groove being disposed at a distance from the weld seam, the distance being between 0.5% and 10% of an external circumference of a running surface of the anti-friction layer, and wherein lubricant from a lubricant supply line is fed to the oil groove via a bore running through the supporting metal layer and through the anti-friction layer.

2. A rolled plain bearing bush made from a composite material comprising a supporting metal layer and an anti-friction layer, wherein the supporting metal layer is disposed underneath the anti-friction layer in the radial direction, wherein the rolled plain bearing bush has a weld seam in an axial direction and an oil groove extending in the axial direction, the oil groove being disposed at a distance from the weld seam, the distance being between 0.5% and 10% of an external circumference of a running surface of the anti-friction layer, and wherein a bore runs through the supporting metal layer and through the anti-friction layer, the bore being configured to supply lubricant from a lubricant supply line to the oil groove.

3. A shaft having the rolled plain bearing bush as specified in claim 2.

4. The shaft according to claim 3, wherein the rolled plain bearing bush is shrunk onto the shaft.

5. The shaft according to claim 3, wherein a lubricant supply line is provided in the shaft and feeds into the bore.

6. A wind turbine gear mechanism having at least one gear, having the shaft as specified in claim 3, and having a bearing point, the at least one gear being mounted on the shaft, the bearing point having the rolled plain bearing bush and being provided between the gear and the shaft.

7. The shaft according to claim 3, wherein the shaft is a planet gear shaft for a wind turbine gear mechanism.

* * * * *